Patented Feb. 1, 1944

2,340,426

UNITED STATES PATENT OFFICE 2,340,426

COFFEE PLASTIC PROCESS

Herbert S. Polin and Albert I. Nerken, New York, N. Y.; said Nerken assignor to said Polin No Drawing. Application September 14, 1940, Serial No. 356,731

8 Claims. (Cl. 260—19)

This invention relates to methods of treating the plant and/or the fruit of the genus Coffea for the production of molding compounds and by-products.

In U. S. P. No. 2,207,069 granted to Herbert S. Polin, there is disclosed a process for producing a molding compound from the coffee bean or the like. The present invention relates to improvements on the process therein disclosed, particularly to the pre-treatment of the coffee materials, whereby the pentosans and other components of the materials which can yield furfural are more advantageously employed.

In the process disclosed by U. S. P. 2,207,069 the coffee bean, after preliminary treatment, is heated in an autoclave under pressure in combination with a quantity of water and, in one embodiment, in the presence of sulfuric acid. It is well known that pentosans, under the above treatment, are converted into furfural. This occurs to the pentosans in the coffee bean and plant. However, under the closed conditions existing in a reaction autoclave, the conversion of pentosans to furfural is accomplished to only a relatively small extent. Furthermore, in the washing of the autoclave product specified in the above mentioned patent, any free furfural present tends to be washed away. Since furfural is a valuable component in the finished product, its loss is undesirable. The present invention proposes to secure a more complete conversion of the pentosans and other compounds to furfural and to secure all or a major portion of the furfural for use, if desired, in the finished plastic product.

To accomplish this end, the coffee bean and/or other parts of the coffee plant are treated as specified in U. S. P. 2,207,069 up to and including the stage where the coffee flour mixture is combined with an equal weight of water and about 2% by weight of sulfuric acid or other mineral acid. The mixture is then placed in a boiler or in the autoclave, if the autoclave has been provided with a vapor outlet. The mixture is heated to about 250° F. under pressure and then steam, under pressure corresponding to the temperature, and preferably under several degrees of superheat, is admitted into the mixture and, after passing through the mixture, allowed to escape through the vapor outlet. The steam simultaneously agitates the mixture and sweeps out the furfural that has been formed. This process is continued for several hours or until the major portion of the furfural has been removed.

The steam and furfural vapor may be now treated in suitable apparatus, which will include a fractionating tower, to produce furfural of any desirable degree of purity.

The mixture remaining in the autoclave or boiler is then further treated under pressure as described in U. S. P. 2,207,069 and up to and including the step in which the autoclave product is washed. The product is drained of excess water and the furfural, obtained as above, added to it. The material is then dried. Or the autoclave product may be washed and dried and the furfural then added to it. Or a portion only of the furfural may be used and the remainder will be available for other industrial utilization. Or it may be found desirable to proceed throughout as disclosed by U. S. P. No. 2,207,069 adding to the product, at a convenient point in the process, furfural obtained from a batch of coffee material, as disclosed above. Or the material remaining after removal of the furfural may be added, wholly or in part, to material being reacted as disclosed in U. S. P. 2,207,069 and the furfural obtained as disclosed added to this latter mixture at a convenient point.

Having thus described the invention, what is claimed for Letters Patent is:

1. A method for the preparation of a molding material from the coffee bean, which consists in: removing the oil from the green coffee bean, fractionating the oil, re-introducing the oleic and linoleic fractions of the extracted oil into the extracted coffee bean, and subjecting to the action of heat, pressure, mineral acid and a continuous supply of steam for removing all furfural formed, recovering the furfural and adding at least a portion thereof to the so-treated coffee bean residue.

2. A method for the preparation of a molding material from the coffee bean, which consists in: removing the oil from the green coffee bean, factionating the oil, re-introducing the oleic and linoleic fractions of the extracted oil into the extracted coffee bean, admixing the resulting product with a dilute aqueous solution of a mineral acid, subjecting to the action of heat, pressure and a continuous supply of steam for removing all furfural formed, drying the resulting coffee bean residue, recovering the furfural, and re-introducing at least a portion thereof into said residue.

3. A method for the preparation of a molding material from the coffee bean, which consists in: removing the oil from the green coffee bean, fractionating the oil, re-introducing the oleic and linoleic fractions of the extracted oil into the extracted coffee bean, admixing the resulting product with approximately an equal weight of an aqueous sulfuric acid solution containing about 2% by weight of the acid, subjecting the mixture to the action of heat at about 250° F., pressure and a continuous supply of steam for removing all furfural formed, drying the coffee bean residue, recovering the furfural, and adding at least a portion thereof to said residue.

4. A method of forming a molded article from the coffee bean, which consists in: removing the oil from the green coffee bean, fractionating the oil, re-introducing the oleic and linoleic fractions of the extracted oil into the extracted coffee bean, subjecting the resulting product to the action of heat, pressure, mineral acid and a continuous supply of steam for removing all furfural formed, recovering the furfural and adding at least a portion thereof to the so-treated coffee bean residue, and molding the resulting product under the action of heat and pressure.

5. A method of forming a molded article from the coffee bean, which consists in: removing the oil from the green coffee bean, fractionating the oil, re-introducing the oleic and linoleic fractions of the extracted oil into the extracted coffee bean, admixing the resulting product with a dilute aqueous solution of a mineral acid, subjecting the mixture to the action of heat, pressure and a continuous supply of steam for removing all furfural formed, washing and drying the so-treated coffee bean residue, recovering the furfural and adding a portion thereof to said residue and molding the resulting product under the action of heat and pressure.

6. A process for producing a molding compound from coffee plant material, which includes as essential steps, reacting such material in the presence of a quantity of acidified water under sufficient heat and pressure to form furfural, sweeping out such furfural substantially as formed with steam, and continuing such reaction to form a resin while reintroducing furfural.

7. A method for the preparation of a molding compound from coffee material, which comprises reacting essentially those chemical compounds found in the coffee material after removal of the carnaubic, palmitic and daturic acid, in the presence of mineral acid under high temperature and pressure while sweping off the furfural as formed by a supply of steam, recovering the furfural, and adding furfural thus recovered to said coffee material while same is undergoing later stages of reaction in accordance with the aforesaid reacting step.

8. A method for the preparation of a molding compound, which consists in reacting essentially those chemical compounds found in a coffee plant material, comprising the tannins, aldehydes, hydroxy-compounds and nitrogenous compounds, under pressure with an acid catalyst while sweeping out the furfural as formed with steam, recovering the furfural, and adding furfural to said coffee material while same is undergoing later stages of reaction in accordance with the aforesaid reacting step.

HERBERT S. POLIN.
ALBERT I. NERKEN.